March 21, 1933. J. W. GURLEY 1,902,231

AUTOMATIC UNLOADING CHECK VALVE

Filed July 31, 1931

INVENTOR,
John W. Gurley,
BY
Howard D. Smith,
His ATTORNEY

Patented Mar. 21, 1933

1,902,231

UNITED STATES PATENT OFFICE

JOHN W. GURLEY, OF MIAMISBURG, OHIO, ASSIGNOR TO THE DAYTON AIR COMPRESSOR COMPANY, OF DAYTON, OHIO, A CORPORATION OF OHIO

AUTOMATIC UNLOADING CHECK VALVE

Application filed July 31, 1931. Serial No. 554,171.

This invention relates to new and useful improvements in automatic unloading check valves.

It is one of the principal objects of my invention to provide a simple and efficient automatic unloading check valve that is particularly adapted for use in fluid compressors. During the operation of the compressor it will remain open to permit a free passage of the fluid flow to the tank. However, when the compressor stops, it will instantly check that flow to the tank and divert the fluid between the pump and check valve to the atmosphere, so that the compressor may start again without a pressure load.

It is another object of my invention to provide in the check valve plunger an inlet port of greater cross-sectional area than the outlet port to interpose sufficient fluid pressure against the closing of the valve between the pump impulses so long as the compressor is in operation.

It is another object of my invention to provide a check valve which is substantially noiseless in operation.

Other important and incidental objects will be brought out in the following specification and particularly set forth in the subjoined claims.

Figures 1, 2:
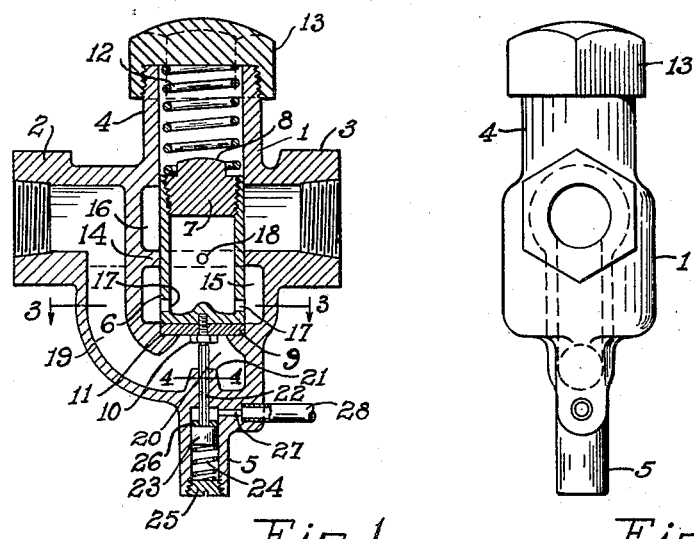
Figure 3:
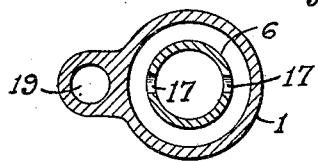
Figure 4:

In the accompanying drawing Figure 1 is a longitudinal, sectional view taken through my automatic, unloading check valve. Figure 2 is a side elevational view of the same. Figure 3 is a cross-sectional view taken through said valve body on the line 3—3 of Figure 1, showing the inlet ports in the check valve plunger. And Figure 4 is an enlarged cross sectional view taken through the valve body on the line 4—4 of Figure 1, showing the rectangular pin through the side grooves of which the fluid remaining in the compressor after it stops, passes to the conduit which communicates with the atmosphere.

Referring to the accompanying drawing for a detailed description of the invention, the numeral 1 designates the check valve body which is of substantially T-shape, having a tubular inlet arm 2 and a tubular outlet arm 3 in horizontal alinement, with a central tubular head 4 and an opposite tubular valve receiving end 5.

The middle portion of the valve body 1 is bored to receive a hollow reciprocable plunger or piston 6 open at its top end for closure by a threaded plug 7 having a spring receiving head 8 of reduced diameter.

To the lower flat end of the piston 6 a disc-shaped valve member 9 is secured by a cap screw 10. This valve member is normally adapted to rest upon an annular seat 11 formed by a shoulder on the lower interior portion of the valve body. Upon this seat the check valve assembly just described is firmly held by a helical spring 12 which is contained within the tubular head 4, fitting at its lower end around the reduced portion 8 of the plug 7 and engaging at its upper end a nut 13 applied to the exteriorly threaded outer end portion of said head.

The valve body 1 is divided by a middle horizontal partition 14 into a fluid receiving space or chamber 15 and a space 16 which is an inward extension of the outlet port provided by the tubular arm 3. Communicating with the chamber 15 are two radial ports 17, 17 formed in the inner end of the piston 6, while a port 18 of less diameter in the piston wall is adapted to communicate with the space 16 in the valve body when the piston is moved outwardly a sufficient distance. Such outward movement is imparted to the piston 6 by the pressure of the fluid flow from a pump (not shown).

Fluid such as air compressed by the pump, enters the valve body 1 at the inlet 2, flowing thence through a curved passage 19 in the valve body to the space 20 therein immediately below the valve disc 9.

When the compressor is in operation the pressure of the fluid entering this space is sufficient to raise the valve piston 6, to permit the fluid to freely flow into the chamber 15, and thence through the ports 17, 17, into the interior of the piston. From the latter it will flow in a reduced amount through the smaller port 18 into the chamber 16 and thence through the outlet 3 to a tank (not shown). Since the outlet port 18 is of less cross sectional area than the inlet ports 17, 17, sufficient outward pressure will be exerted against the piston to hold the valve disc 9 above its seat 11 between the pump impulses so long as the compressor is in operation, thus permitting an uninterrupted flow of fluid through the valve from the pump to the tank during that time.

When the compressor stops, I have provided the following means for quickly and efficiently unloading the fluid remaining in the compressor behind the check valve. Referring to Figure 1, the numeral 21 designates a hollow boss formed on the interior surface of the valve body, just above its lower tubular end 5. This boss and the casting wall beneath it are bored to receive an axial, rectangular pin 22, which at its upper end, is adapted to engage the cap screw 10. The lower end of this pin 22 projects into the tubular end 5 of the valve body, and has secured to that end a small piston 23. An inward pressure is continually exerted upon this piston 23 by a helical spring 24 which is compressed against it by a screw 25 inserted in the interiorly threaded outer end of the tubular member 5.

Secured to the inner face of the small piston 23 around the pin 22 is a valve disc 26 which is adapted to cover and uncover a horizontal port 27 in the lower portion of the valve body 1, that communicates with a tube 28. This tube, the inner end of which is fitted in a recess in the valve body, opens at its outer end to the atmosphere.

When the pump stops, the piston 6, under the pressure of the helical spring 12 will be forced down quickly to cause the valve member 9 to engage the seat 11, thus preventing a continuation of the flow of fluid from the passage 19 into the space 16. The seating of the valve member 9 brings the piston 6 to a position wherein the port 18 in its wall will be below the space 16 in the valve body, so that there can be no back flow of the fluid into the piston after the compressor has ceased its operation.

The downwardly moving valve member 9, through its engagement with the pin 22, will force the valve disc 26 below the port 27 to uncover it, whereupon the fluid remaining in the passage 19 and space 20, will flow through the grooves in the rectangular pin 22, into this port and through it to the atmosphere. It is thus seen how quickly and efficiently the compressor may be unloaded after it stops.

When the compressor again starts, it will do so without a pressure load. And when the fluid flow raises the valve 9, the pin 22, under the pressure of the spring 24, will follow it upwardly to cover the unloading port 27 with the valve member 26.

Having described my invention, I claim:

1. A check valve of the type described, comprising a valve body formed with a central bore, a hollow piston valve reciprocable in said bore, a seat for said piston valve, said valve body having a fluid inlet passage below said piston valve, and a fluid outlet passage, a spring for normally holding said piston valve upon its seat, said piston valve formed with an inlet port through which fluid may enter it after it has been raised by said fluid, and also having an outlet port of less diameter than the inlet port for communication with the outlet passage when the piston valve is above its seat.

2. A check valve of the type described, comprising a valve body formed with a central, axial bore, a hollow piston valve reciprocable in said bore, a seat for said piston valve, said valve body having a fluid inlet passage below said piston, and a fluid outlet passage above the seat for said piston valve, a partition in said valve body separating the fluid inlet passage from the outlet passage, a helical spring in engagement with the head of the piston valve to hold it upon its seat, said piston valve formed with an inlet port in its lower portion through which fluid may enter it after it has been raised by said fluid, and also having an outlet port of less diameter than the inlet port, to discharge said fluid into the outlet passage after said outlet port has passed above said partition.

In testimony whereof I have hereunto set my hand this 29th day of July 1931.

JOHN W. GURLEY.